United States Patent [19]
Silverstein

[11] Patent Number: 5,943,306
[45] Date of Patent: Aug. 24, 1999

[54] DISC CHANGER WITH [SAFE AND EFFICIENT DISC HANDLING] TOP DRIVE TRANSFER MECHANISM APPLYING VARIABLE FORCE TANGENTIAL TO TOP EDGE OF DISC BEING TRANSFERRED

[75] Inventor: Paul W. Silverstein, Miami, Fla.

[73] Assignee: CD Server Corporation, Miami, Fla.

[21] Appl. No.: 08/941,468

[22] Filed: Sep. 30, 1997

Related U.S. Application Data

[63] Continuation of application No. 08/464,408, Jun. 5, 1995, abandoned.

[51] Int. Cl.$^6$ ............................. G11B 17/22; G11B 17/24
[52] U.S. Cl. .............................................. 369/37; 369/178
[58] Field of Search ............................... 369/37, 36, 204, 369/192, 38, 178

*Primary Examiner*—Stuart S. Levy
*Assistant Examiner*—Angel Castro
*Attorney, Agent, or Firm*—Robert M. Schwartz

[57] ABSTRACT

Automatic disc changer apparatus includes a tray containing elastomeric grooves designed to securely hold multiple compact information storage discs in generally upright positions, one or more stations, each performing processing operations on discs transferred from the tray one at a time (operations such as reading information from discs and/or writing information to them), mechanism for effecting relative movement between the tray and the stations for aligning a selected groove in the tray with a station, a transfer mechanism associated with each station for moving a disc from the selected groove to a loading position at the station, and from that position back to the tray, in controllably driven rotations, and latch mechanism for laterally moving the disc between the loading position and a processing station. In the controllably driven rotation, top and bottom edges of each selected disc are flexibly constrained while a force is applied to the disc tangential to its top edge. After processing, the selected disc is returned to the tray in a controllably driven reverse rotation. In the rotation from the loading position back to the tray, the selected disc may be returned to the tray either at the groove position from which it was previously removed or a different groove position.

2 Claims, 11 Drawing Sheets

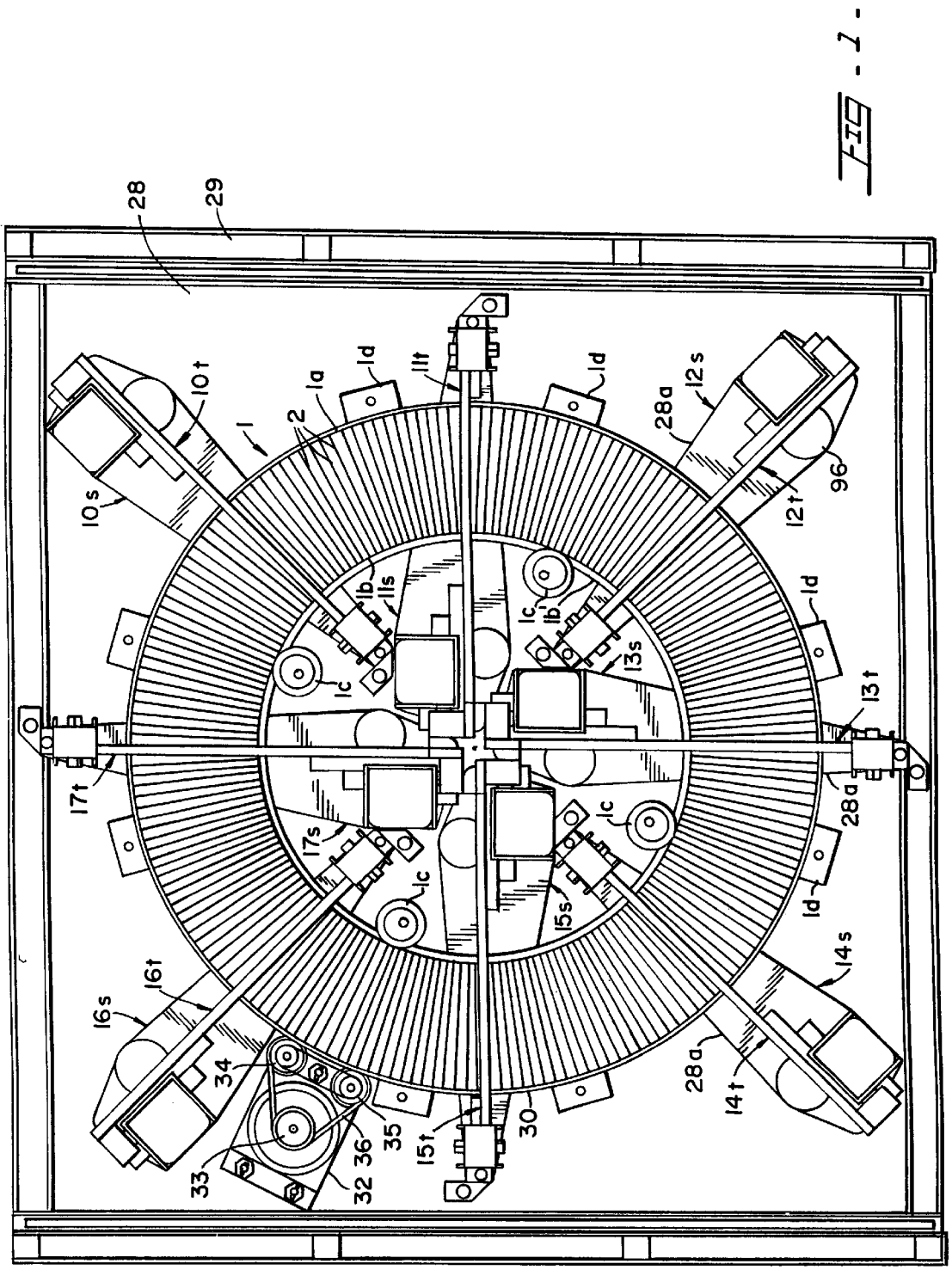
FIG - 1 -

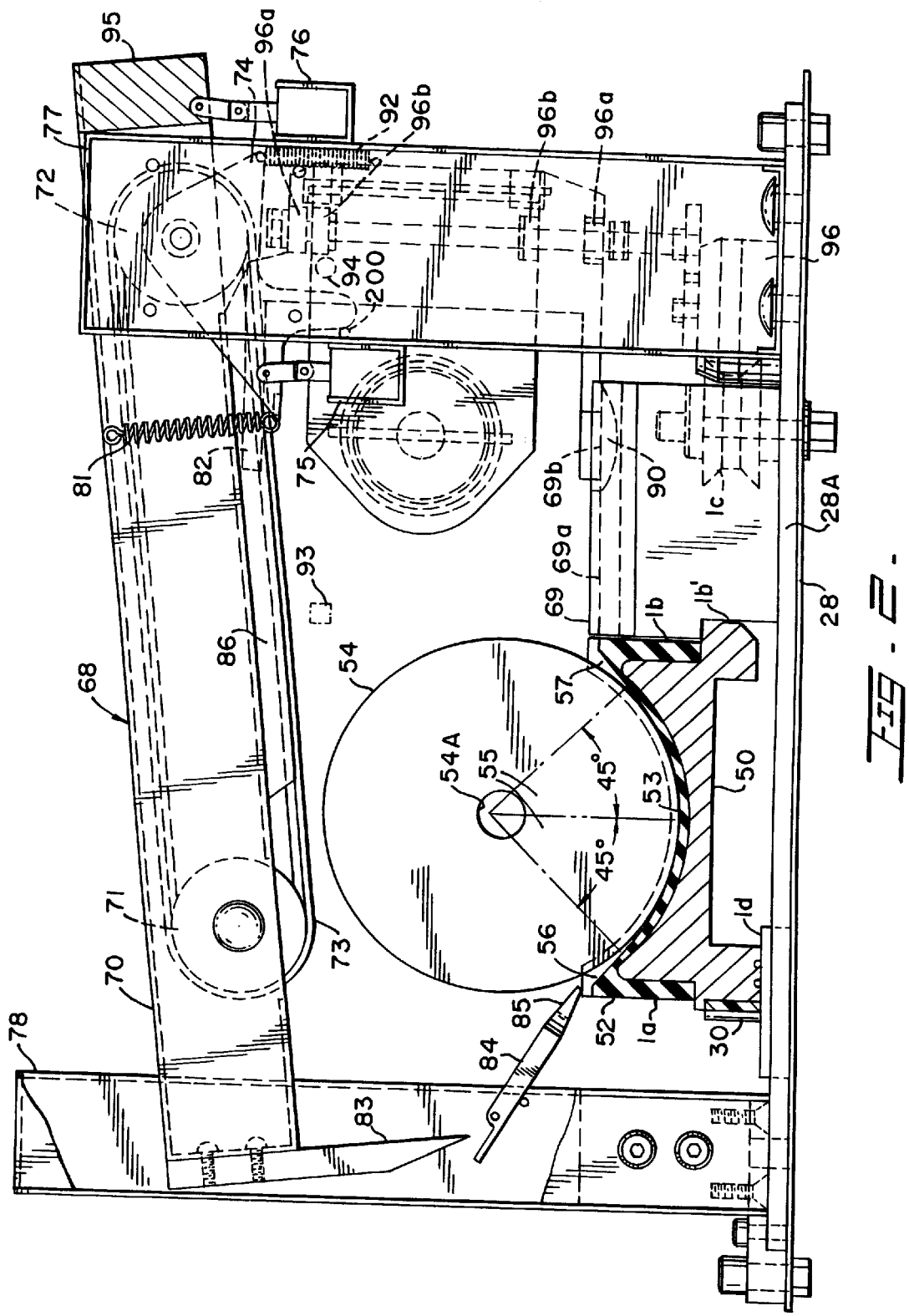

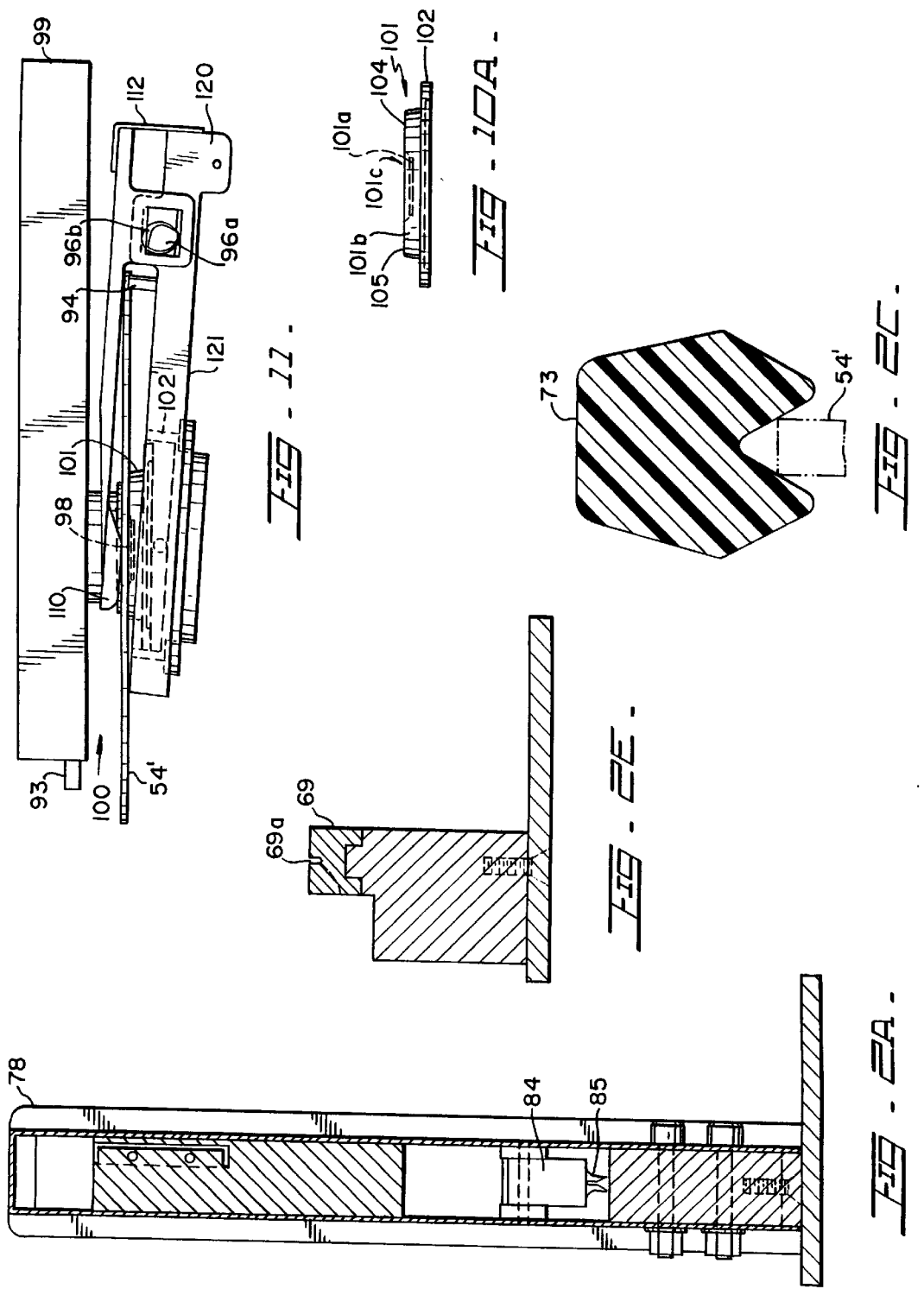

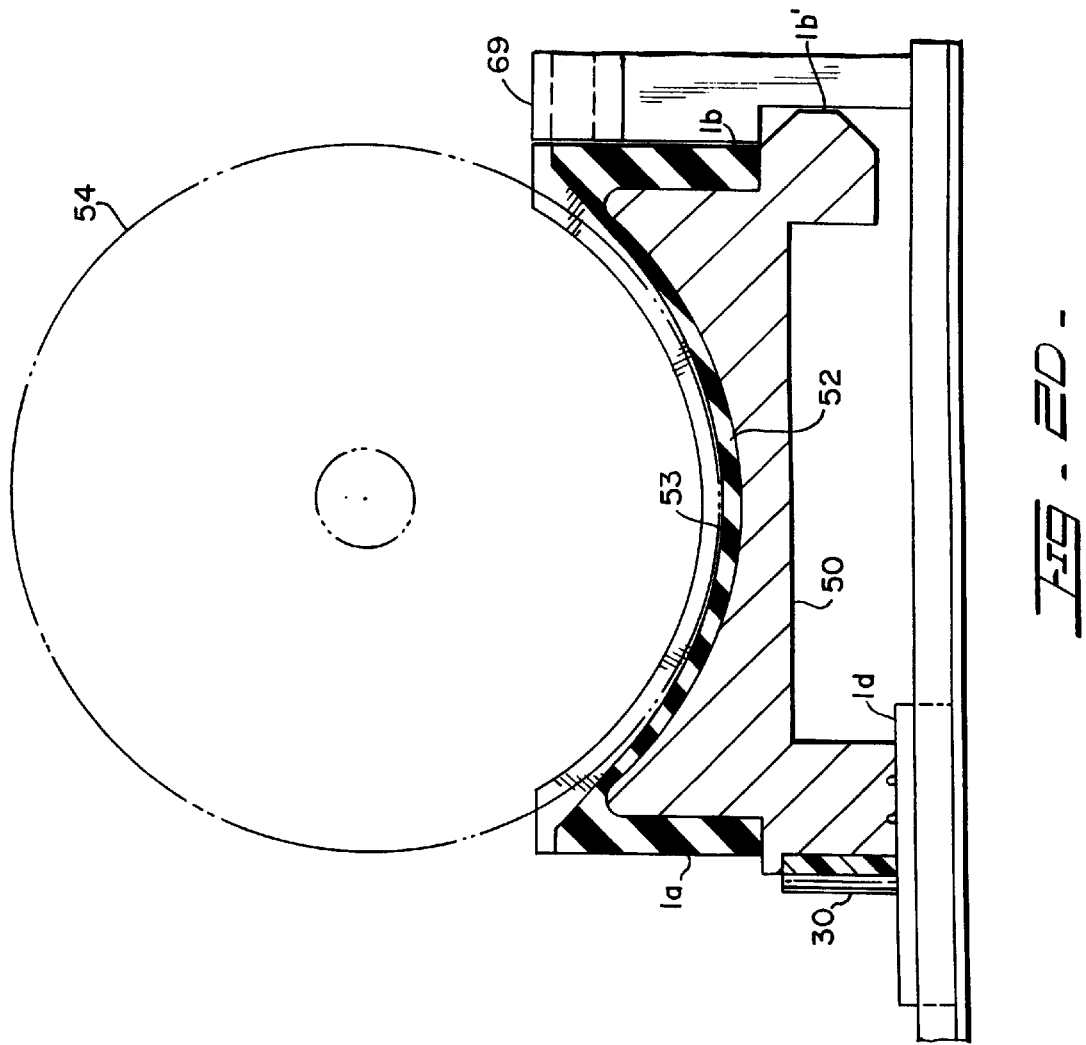

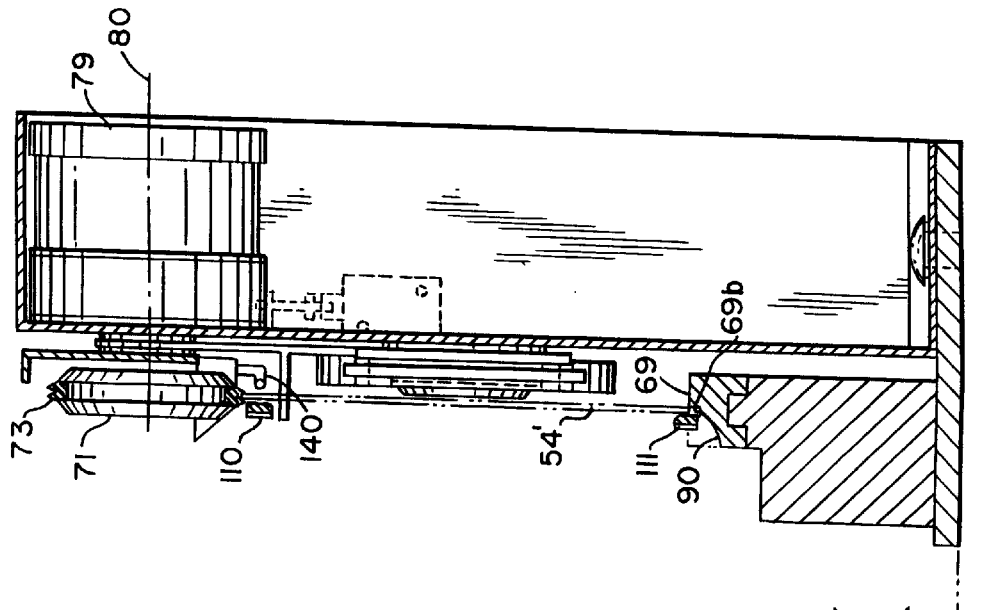
Fig. 6.
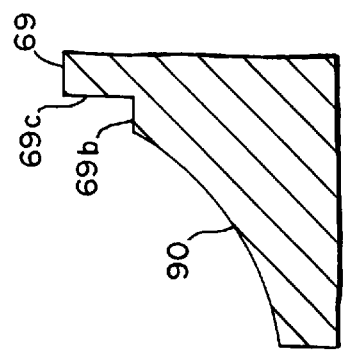
Fig. 2F.
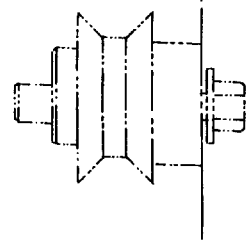
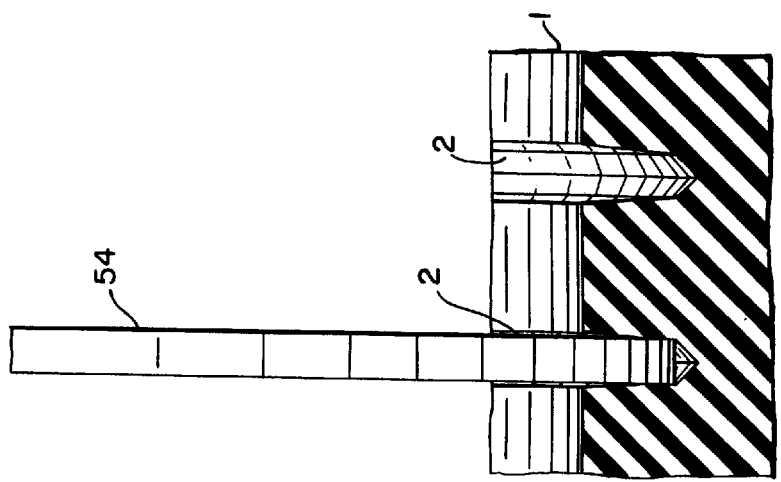
Fig. 2B.

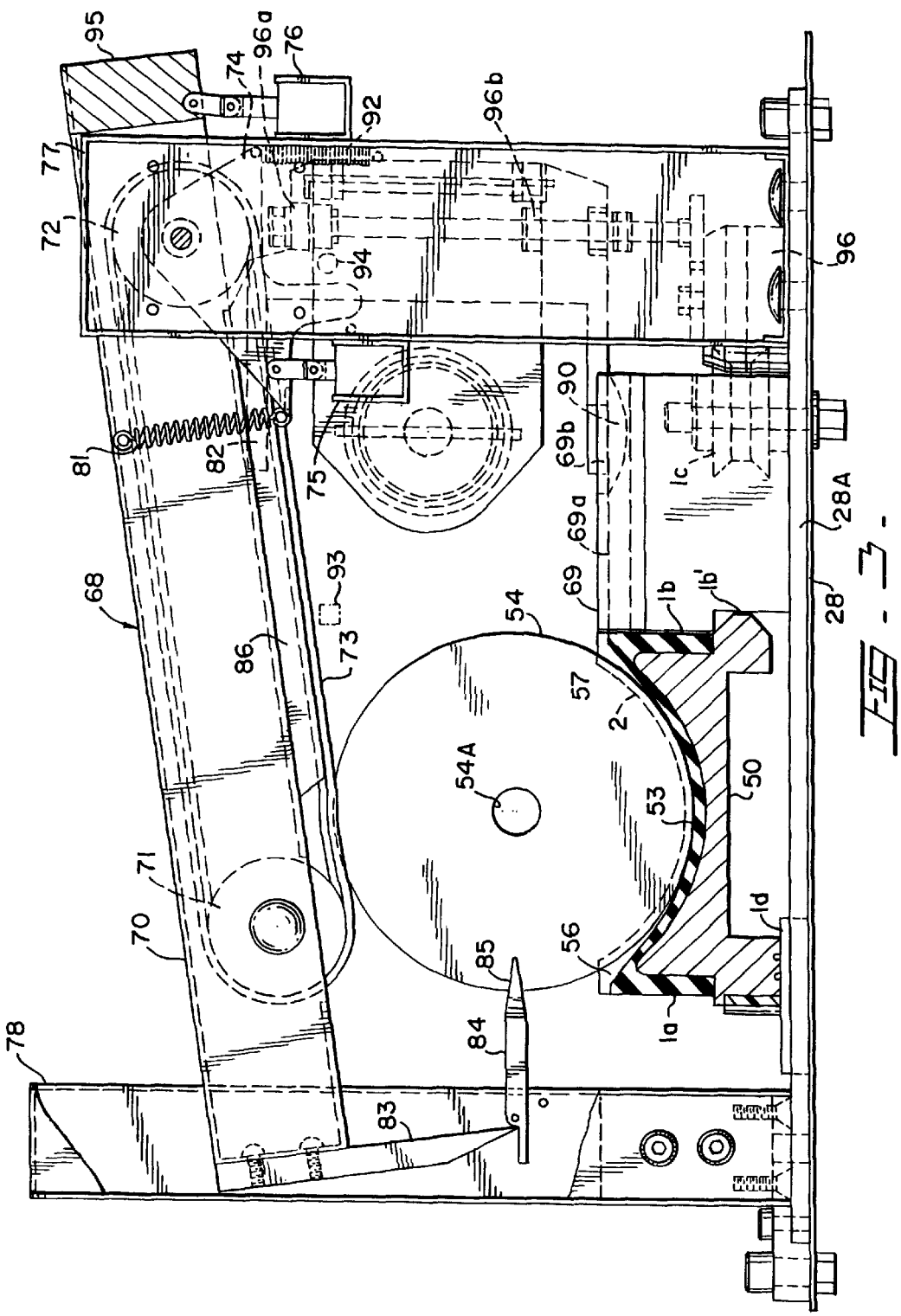

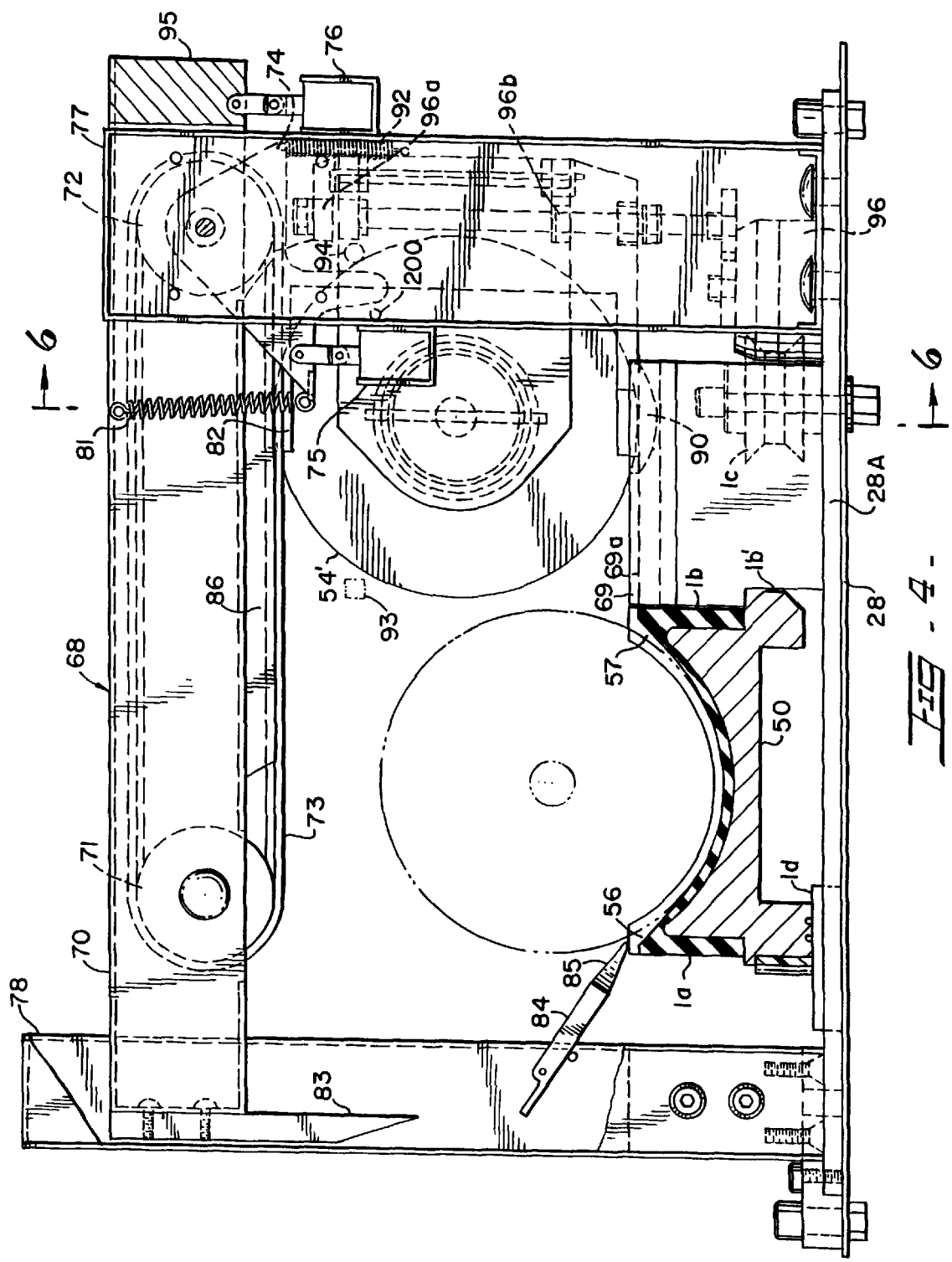

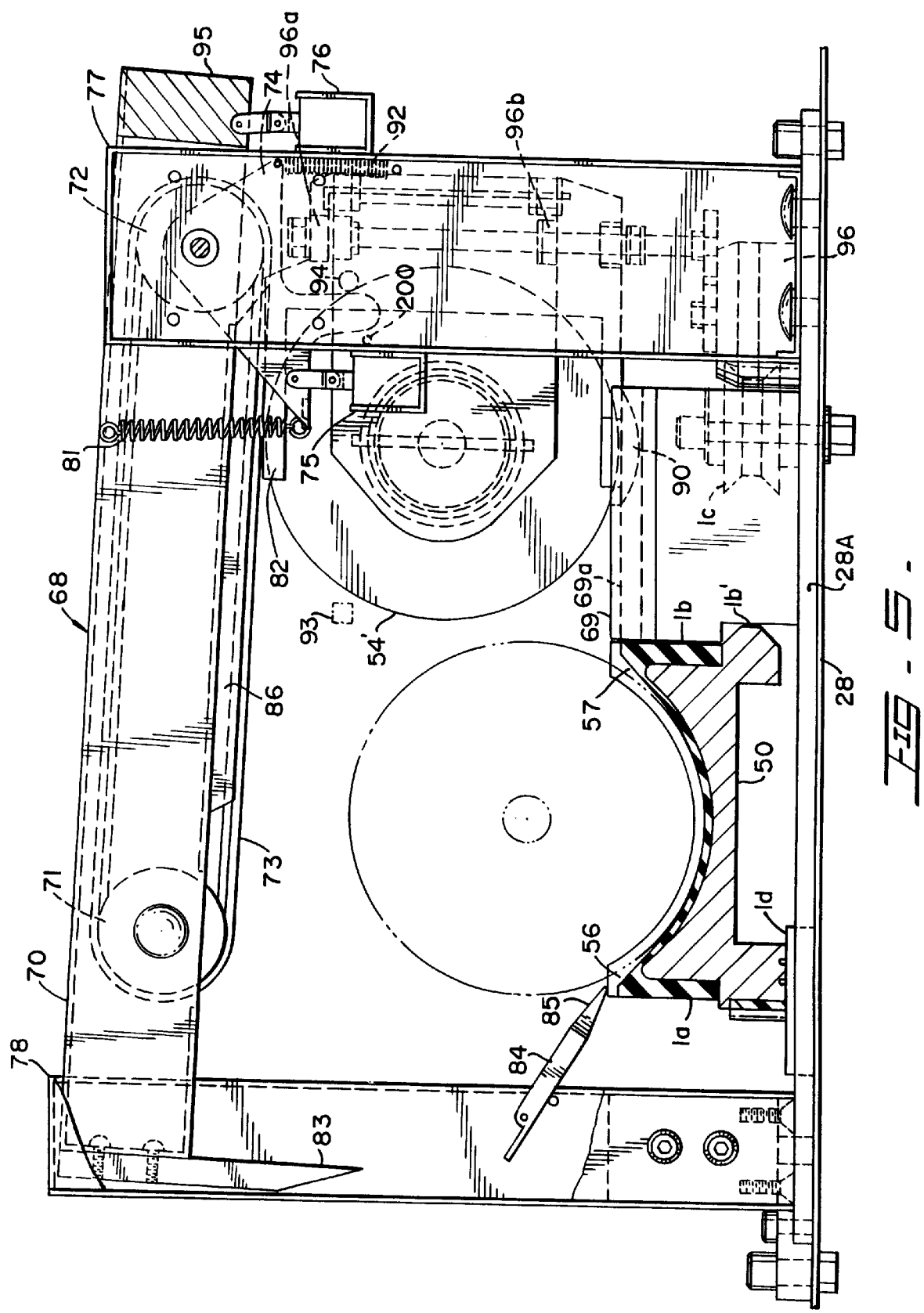

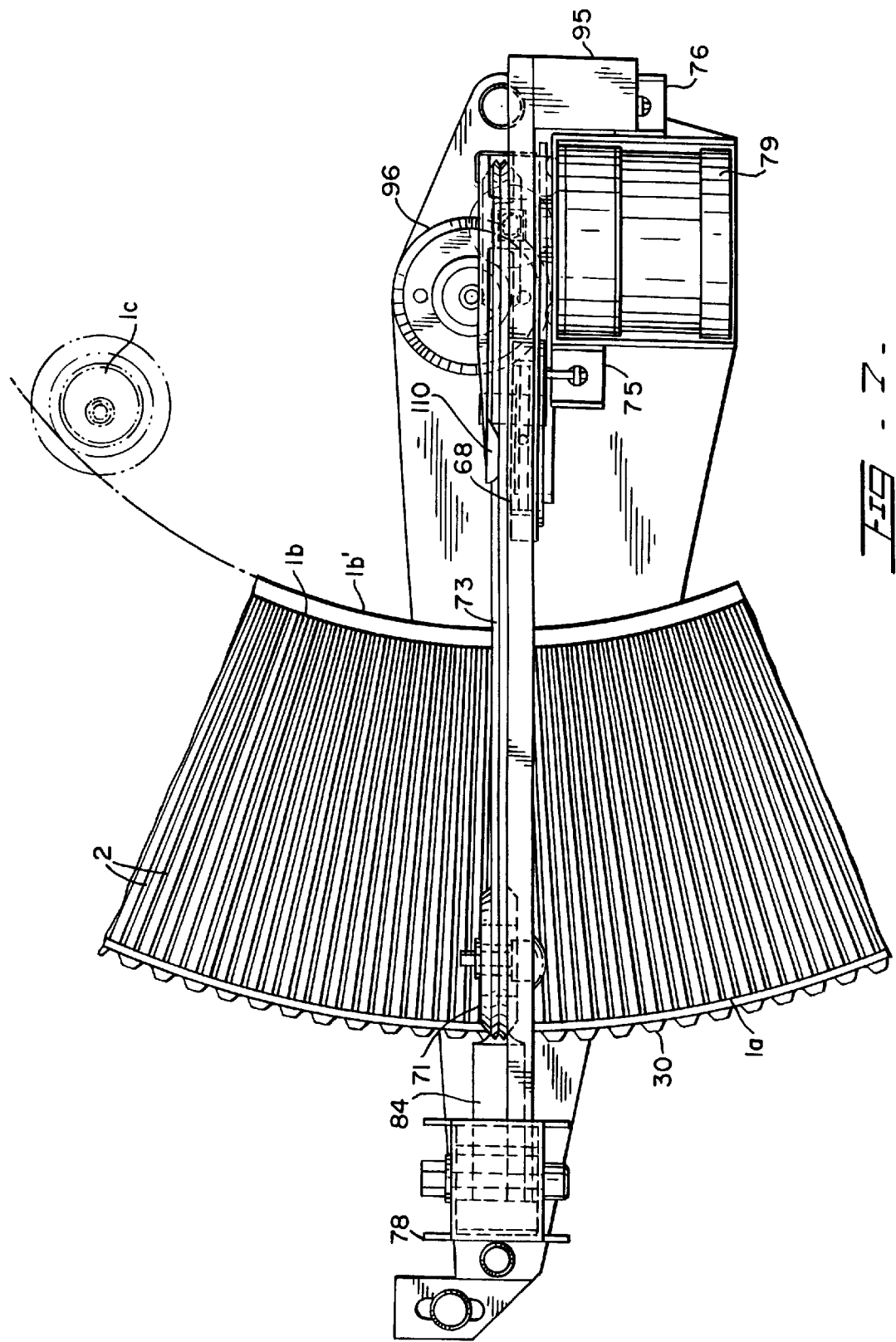

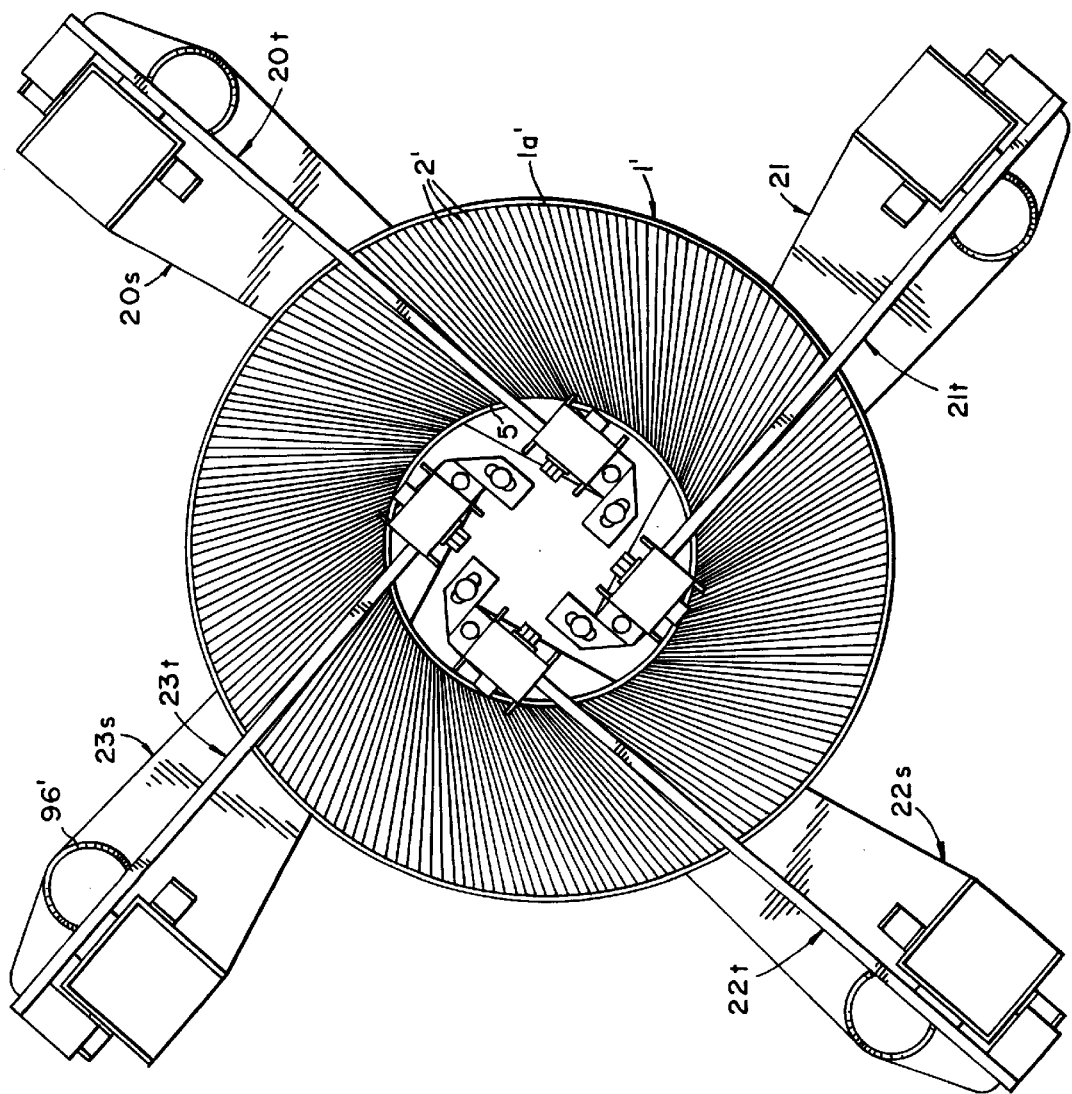

DISC CHANGER WITH [SAFE AND EFFICIENT DISC HANDLING] TOP DRIVE TRANSFER MECHANISM APPLYING VARIABLE FORCE TANGENTIAL TO TOP EDGE OF DISC BEING TRANSFERRED

This application is a continuation of U.S. application Ser. No. 08/464,408, filed Jun. 5, 1995, now abandoned.

BACKGROUND OF THE INVENTION

1. Field of the Invention

This invention pertains to automatic disc changers; particularly those of the type wherein multiple data discs are held in close proximity, in a common receptacle or tray, and transferred one at a time between the tray and a processing station (typically, a location where information is read from and/or written to the discs).

Discs of the type presently contemplated include those commonly known as compact discs (CD's), which are used to store digital information for computers (e.g. digital data and computer programs), and information representing reproducible audio and/or video presentations that do not require a computer for reproduction. Such compact discs may have differing recording formats and playback protocols, and different names indicating their usage; e.g. names such as CD-ROM (compact disc—read only memory), CDR (compact disc—recordable), etc. Their names, recording formats and playback protocols have no specific relevance to the present invention.

The present invention is concerned particularly with providing automatic disc changer apparatus, and an associated method of disc handling, that is safer and more efficient than known prior systems.

Terminology

Controlled drive: (also "controllably driven") connotes transfer of discs over a defined range, by edge drive, with bottom and top edges constrained in a manner allowing the rate of movement to be optimized throughout the range, without compromising disc safety.

Disc Reader: a unit such as a CD-Rom drive, for performing a processing action on discs including actions such as reading and writing.

Safe and efficient: connotes efficient handling of discs without compromising the integrity of storage; "efficient" connoting quick and cost-effective handling of large numbers of discs (e.g. 400 discs in a disclosed preferred embodiment).

Station: position or place containing a disc reader and a platform from which discs are moved to the reader and to which discs are moved from the reader.

Idle Station: a station not holding a disc, and not in the process of loading or unloading a disc (see Loading and Unloading below).

Transfer: connotes movement of a disc between a tray and a station.

Loading: transfer of a disc from a tray to a station.

Unloading: transfer of a disc from a station to a tray.

2. Prior Art

Presently known automatic disc changer systems are rather expensive and slow acting. For example, one known system has an average access time (the time for locating a disc and transferring it to a station) on the order of 15 seconds. Such systems also are constrained by safety considerations to handle fewer discs than would be desired in many applications.

PRINCIPAL OBJECTIVE OF THE INVENTION

This invention seeks to provide an automatic disc changer system that is safer and more efficient than prior art systems.

In the preceding sentence, "safer and more efficient" is intended to mean having capability for handling a given number of discs with less risk of damage (or loss of recorded information) than comparable prior systems, and also having capability for safely handling more discs than prior systems, provide faster access to individual discs than prior systems, and be made at favorable cost in comparison to prior art systems.

SUMMARY OF THE INVENTION

The present invention includes a tray for holding multiple discs in close proximity to each other, one or more processing stations, a disc positioning assembly for effecting relative movement between the tray and station(s) to align a selected disc in the tray with a station, a disc transfer assembly for moving selected discs between the tray and station, one at a time, in controllably driven rotational movements (see Terminology discussion above), and a load/unload assembly for moving the selected discs between the transfer assembly and a processing position at the station (e.g. a position in which the disc is securely mounted on a freely rotatable spindle for interaction with reading and/or writing apparatus).

In a system with a single station, the disc positioning assembly is used to prepare a selected disc for transfer to that station by the disc transfer and load/unload assemblies of that station. In a configuration with plural stations, each station has an associated disc transfer assembly and load/unload assembly; and the disc positioning assembly is operated to position a selected disc for transfer between the tray and a nearest "idle" station. An idle station in the foregoing context, is one that is currently not holding a disc and not engaged in the process of loading or unloading one (see Terminology above).

The tray has a large capacity (e.g. for holding 400 compact discs) and specially constructed grooves for holding the discs in close proximity to each other. The grooves, which are formed in a relatively soft elastomeric polymer medium, elastically "pinch" individual discs along their bottom edges. The tray may have either a circular or rectangular shape. If the tray is circular, the positioning assembly effects rotational relative movement between the tray and station(s). If the tray is rectangular, the positioning assembly effects linear relative movement between the tray and station(s).

Each disc transfer assembly overlies the tray and the (respective) station, and operates to move discs bidirectionally, one at a time, between the tray and (respective) station in controllably driven movements in which top and bottom edges of the disc are controllably held and guided throughout the movement. Each load/unload assembly is at or proximate to the (respective) station and operates to move the disc bidirectionally between the transfer mechanism and a processing position at the station (e.g. a position in which the disc is mounted upon a spindle that is freely rotatable for presenting the disc for interaction with reading and/or writing equipment). When the load/unload assembly receives a disc from the (respective) disc transfer assembly, the disc/transfer assembly is operated to disengage itself from contact with the disc.

Each transfer assembly of this invention operates to securely hold and guide top and bottom edges of a disc throughout each transfer movement, and to apply a time varying force to the top edge of the disc that is effective to quickly yet safely accelerate the disc at the start of each transfer, and quickly yet safely decelerate the disc at the end of each transfer. The elastomeric gripping and guiding of the disc at its top and bottom edges permits the disc to be accelerated and decelerated faster than would otherwise be safely feasible.

In a preferred embodiment described below, each transfer mechanism includes a topdrive assembly that contacts the top edge of the disc during transfer, and a level stage between the tray and respective station that contacts the bottom edge of the disc while the disc is in transit between the tray and the load/unload assembly.

A groove in the stage forms a supporting and guiding channel for the bottom edge of the disc during transfer handling. The groove in the stage is aligned with the desired path of movement of the disc, and is formed in an elastomeric polymer that is harder than the material in which the grooves in the tray are formed. Thus, the groove in the stage holds and guides the bottom edge of the disc during a transfer, preventing the bottom edge from rolling out of the required transfer path, but it does not "pinch" the respective edge so as to potentially impede the transfer (or increase the force required to move the disc over the stage).

The topdrive assembly includes an arm carrying a pair of pulleys that support a flexible belt. The arm and belt overlie both the discs in the tray and the station, and they are movable as a unit to position the bottom surface of the belt in contact with the top edge of a (selected) disc in the tray, as well as to disengage the belt from such contact when the respective disc has been transferred to the (respective) load/unload assembly. The belt is aligned with the station and its bottom surface (that contacts the top edge of a disc during transfer) is shaped in an inverted V formation that serves as a guiding channel for the top edge of a disc during each transfer. The V formation in the belt serves to center top edges of opposite surfaces of the disc and thereby keep the disc vertically aligned during the transfer movement.

One of the pulleys is linked to a bidirectional step motor that is activated when the belt is in contact with the top edges of a disc being transferred. This moves the belt linearly relative to the disc it is contacting, to exert a driving force along the top edges of that disc which causes the disc to rotate in a direction determined by the activated step motor (from the tray towards the station during loading, and from the station towards the tray during unloading).

Each "disc holding" groove in the tray has a bottom portion shaped as a circular arc congruent to an arc portion of a disc, and side portions that aligns to the groove in the stage when the tray and stage are suitably positioned for transferring a disc from the respective groove in the tray to that in the stage. As shown in the preferred embodiment, wherein stations are on different sides of a circular tray (inside the inner periphery and outside the outer periphery) or on different sides of a rectangular tray, each groove in the tray has side portions extending symmetrically from the bottom portion to positions at which the disc would move from the tray to stages positioned on different sides of the tray. Each side portion of a groove in the tray is gradually inclined towards a respective side of the tray, so as to moderate the force required to move a disc up from the bottom portion of the respective groove in the tray and out onto the groove in a stage located on the respective side of the tray.

As a safety feature, the groove in the stage and inverted V formation in the belt are designed (in form and relative hardness) to prevent contact with lateral surfaces of the disc inside of a predefined (and generally standardized) non-recording margin close to the disc periphery.

During downward movement of the arm and belt at the start of a loading transfer (from tray to station), an aligning sub-assembly (of the transfer assembly) is actuated to ensure that the top edge of the disc selected to be transferred is suitably aligned with the belt to seat securely in the guiding channel formed by the inverted V in the belt. The aligning sub-assembly includes a pick carried on the end of the arm and a comb pivotally mounted adjacent to and outside the tray at a position aligned with the station.

As the arm descends, the pick engages and rotates the comb causing a pair of tapered teeth on the latter to sweep upward across a side edge of the disc facing the comb. The comb teeth are formed to reliably capture the disc between them, and to straighten out either surface of the disc if either surface is misaligned in relation to the plane intersecting the V groove in the belt and the middle of the respective holding groove in the tray. Furthermore, the comb teeth are sized to minimize contact with surfaces of the disc inside of a non-recording margin close to the periphery of the disc, and formed of a frictionless plastic material (e.g. DELRIN. Delrin is a registered Trade Mark of Dupont de Nemours Company) to minimize friction between the comb and the disc.

A feature of the foregoing aligning sub-assembly is that its operation is coordinated with that of the topdrive belt during disc loading so as to retract the comb from the disc as the latter is driven onto the stage, so that the tray can be repositioned while the loading transfer is being performed.

At the beginning of each loading transfer, the disc contacted by the belt moves up the incline in its holding groove onto the stage, and the belt and arm follow upwardly. This upward movement of the arm retracts the pick, allowing the comb to fall back to its initial idle position, in which the teeth of the comb are outside of the path of movement of the tray and its discs. Thus, as soon as a disc is transferred out of the tray to the stage, the tray can be moved to reposition its grooves. In a single station system, this repositioning can be used for instance to (quickly) establish a new holding position in the tray for a disc just removed from another holding position. In a system with plural stations, this repositioning is useful for instance to permit the system to start positioning a second disc relative to a second (idle) station before completion of the process of loading a first disc into a first station.

In a preferred embodiment to be described, the tray is moved by a bidirectional driving mechanism to align discs for transfer to plural stations. It is also considered feasible to move the stations, and their respective transfer and load/unload assemblies, relative to a non-moving tray to accomplish the same disc positioning function; and alternate embodiments involving such configurations are described.

In the preferred embodiment a circular tray (carousel) holding many compact discs e.g. 400 discs is rotatably positioned relative to e.g. 8 stations, each station having respective transfer and load/unload assemblies. The tray has inner and outer peripheries forming concentric circles, and the transfer assemblies and load/unload assemblies of each station are aligned with radii of these circles. Four of the stations and their transfer and load/unload assemblies are located inside the inner periphery of the tray, and the other four stations and their assemblies are located outside the outer periphery of the tray. Thus, the tray and stations are packaged to efficiently use almost all of the space required to house the tray alone.

In this embodiment, the discs are held in the tray in uniquely structured disc holding grooves that are uniformly spaced and aligned with the radii of the tray peripheries, and the tray is rotated clockwise and counter-clockwise to align a selected disc holding groove with a station that is to process a disc currently seated in the selected groove. The direction of rotation of the tray is chosen to move the selected groove to the idle station closest to that groove at the time of selection (i.e. before the tray is rotated); thereby reducing the average "seek" time for aligning discs to be transferred. As noted previously, the controlled handling of disc transfers between the tray and stations allows the transfer movements to be performed in less time than they otherwise could. Thus, apparatus according to this embodiment tends to have a short average time for accessing individual discs (such time including the sum of average seek time and average transfer handling time).

Along its inner periphery, the tray is supported for rotation by four uniformly positioned eccentric ball bearings. The underside of the tray is supported for rotation by eight load-bearing pads. The bearings contacting the inner periphery are covered in polyurethane and formed into "tire rim" configurations dovetailing with and riding along matching projections at the inner periphery of the tray. The load bearing pads under the tray are made of high molecular weight polyethylene presenting high-slip (very low friction) surfaces to the underside of the tray.

Rotational movements of the tray to align discs with stations are actuated by a bidirectional step motor through a special arrangement of gears and timing belts linked to the outer wall of the tray. Teeth on gears linked to the step motor mesh with inside teeth on a double sided gear belt, the latter having outside teeth meshing with teeth contained on a single sided belt permanently attached to the outer wall of the tray. A feature of this arrangement is that the step motor and its linkage to the tray are designed so that an even multiple of unit step movement of the step motor displaces the tray by the distance separating two adjacent disc holding grooves. As a result of this arrangement, a standard stepping motor, and off-the-shelf 5 pitch linking components (gears, timing belts, etc.) can be used to position the tray (one cost saving), the positioning assembly can be reliably operated "open loop" to position the tray (another cost saving in comparison to closed loop systems), the number of grooves (discs) that can be accommodated on a tray of given size is optimized, and the positioning assembly can be made to have a direct correlation in its movements with groove spacings at the tray periphery simplifying the positioning controls (by allowing for specification of an even multiple number of step motor steps to displace the tray by a corresponding number of groove spaces between discs, instead of requiring a complex computation to convert groove displacements of the tray into fractional increments of the step motor, etc.).

Another feature of the foregoing tray positioning arrangement is that the teeth or the inside and outside of the double sided timing belt are formed with differing profiles in order to mesh intimately with both the teeth on the driving gears and the teeth on the outer wall of the tray.

The present invention can contain from one to eight stations, depending upon cost and speed considerations (the more stations, the shorter the average positioning time for aligning a disc to a station).

The load/unload assemblies mentioned above have a number of unique features. They have unique structures for moving a disc laterally between respective transfer assemblies and spindles which rotates the disc for processing (reading and/or writing), which structures also serve to secure the disc at critical phases of the loading and unloading actions. In the loading action, these structures act to secure the disc as it is removed from engagement with the respective transfer assembly and mounted on the spindle, and then free the disc and spindle for unencumbered rotation. In the unloading action, these structures act to secure the disc as it is being disengaged from the spindle, and then release the disc for return to the tray as the disc is controllably engaged by the respective transfer assembly.

The foregoing structures also include elements acting to balance forces exerted on the disc as it is moved between the transfer assembly and station spindle so as to prevent undue flexing or warping of the disc.

In addition to performing read and write processes relative to the discs, the stations and associated transfer and load assemblies can be used to hold discs for repositioning. In such operations, a disc is transferred to a station from a selected first groove in the tray, held in the station while the tray is positioned to align a selected second groove in the tray with the respective transfer assembly, and the disc is then unloaded to the second groove. As noted earlier, an aligning sub-assembly, which ensures vertical alignment of a disc as it is being engaged by the topdrive belt in preparation for loading, is operated in coordination with the topdrive belt so as to permit repositioning of the tray even before the disc is fully loaded into the station. Thus, in the foregoing disc holding and repositioning application, the time required for moving the disc between first and second grooves in the tray can be significantly shortened.

In alternate embodiments briefly described herein, a station together with its transfer and load/unload assembly are rotated relative to a tray constituting an arc portion of the carousel characterized above, and a rectangular tray is positioned linearly relative to one or more stations together with respective transfer and load/unload assemblies arranged on opposite sides of the tray and its path of movement.

The foregoing and other objects, features, advantages and benefits of this invention will be more fully understood by considering the detailed description and claims to follow.

BRIEF DESCRIPTION OF THE DRAWINGS

FIG. 1 is a top elevational view of a preferred embodiment of the invention containing eight processing stations and a circular disc holding tray rotatable relative to all of the stations.

FIG. 2 is a side elevation, partly in section, of a part of the apparatus shown in FIG. 1, showing details of the disc holding tray and a transfer assembly associated with a station inside the inner periphery of the tray; the illustrated transfer assembly being shown in an idle or rest position relative to the tray and its discs.

FIG. 2A shows in elevation details of an aligning sub-assembly associated with the transfer assembly shown in FIG. 2 (viewed from the tray).

FIG. 2B is a transverse section through two adjacent grooves in the disc holding tray shown in FIG. 2. One of the grooves is shown empty and the other is shown holding a disc in order to indicate how the discs fit into the grooves.

FIG. 2C shows a sectional profile of the flexible belt that is part of the transfer assembly, and serves to contact and drive top edges of discs during loading and unloading transfers.

FIG. 2D is a sectional profile of the tray taken along a single disc-holding groove.

FIG. 2E is a sectional view of the stage transverse to a disc guiding groove therein.

FIG. 2F is an enlarged view of a shelf structure at the load position.

FIG. 3 is a side elevation like that in FIG. 2 but showing the transfer assembly in a "pick out" position in which an aligning sub-assembly is operating to ensure alignment of a disc selected to be transferred out of the tray.

FIG. 4 is a side elevation like that in FIG. 3 but showing the transfer assembly in a load position in which it is still in contact with a disc after having moved the disc into position for further latching movement by a load/unload assembly of the respective station. FIG. 5 is a side elevation like that in FIG. 4 but showing the transfer assembly in a read/write position in which it is disengaged from contact with a disc that is ready to be latched into a processing position (wherein the disc is secured to a rotatable spindle and disengaged from contact with elements of the load/unload assembly that otherwise would prevent the disc from rotating with the spindle).

FIG. 6 is a sectional end view of the station shown in FIGS. 2–4, for explaining the construction and operation of a respective load/unload assembly as the latter is receiving a disc from the respective transfer assembly and preparing to move the disc into the above-mentioned processing position.

FIG. 7 is a topview of transfer and load/unload assemblies shown in the preceding figures.

FIG. 10A is a transverse section of the foregoing latch sub-assembly illustrating its construction.

FIG. 11 is a top view of the load/unload assembly showing it operated to move the disc laterally into engagement with a rotatable spindle at the respective station reader.

FIG. 13 is a top elevational view of an alternative embodiment of the invention containing four processing stations and a circular disc holding tray with grooves constructed and arranged to be oblique to the radial edge of said tray.

DETAILED DESCRIPTION

Figure 8:
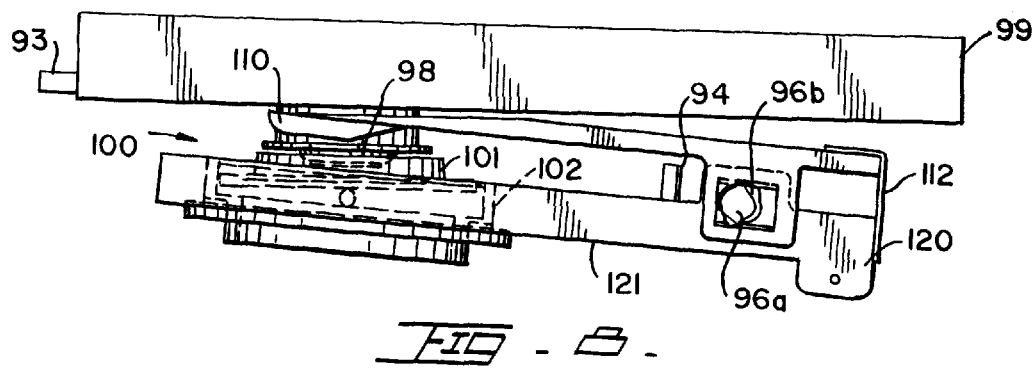
FIG. 8 is a top view of the load/unload assembly, showing it in an idle/rest position when the respective station and transfer assembly are idle.

Construction and operation of a preferred embodiment of the invention are explained in numbered paragraphs 1–9 below. Alternate embodiments are briefly discussed thereafter.

1. General

Referring to FIG. 1, disc changing apparatus in accordance with a preferred embodiment of the invention includes circular tray 1, containing disc holding compartments formed by grooves indicated generally by lines 2. In this embodiment, the tray contains 400 such grooves for holding up to 400 compact discs. Tray 1 has an outer periphery 1a and inner periphery 1b. These peripheries form concentric circles. The grooves 2 are aligned with radii of these concentric circles.

The apparatus also includes eight processing stations 10s through 17s, and eight associated disc transfer and load/unload assemblies 10t through 17t (10t associated with 10s, 11t with 11s, 12t with 12s, etc.). Each said processing station is mounted on a processing station base 28a (for modular insertion and removal). Four of the stations (11s, 13s, 15s and 17s) lie and are orientated outside the outer circular periphery 1a of the tray, and the other four stations (10s, 12s, 14s and 16s) are located and are orientated inside the inner circular periphery 1b of the tray. In the embodiment shown in FIG. 1, the transfer and load/unload assemblies are all aligned with radii of the concentric circles formed by the tray peripheries.

As noted earlier, discs are selectively transferred from the tray to the station, one at a time, and the station performs a process relative to each disc. Typically, the process involves reading information from or writing information to the disc; however, the process also may consist of holding the disc while repositioning the tray, so as to allow for transfer of a disc from one groove position in the tray to another one.

The foregoing elements are supported on a base indicated generally at 28, and housed within a covering enclosure having sides suggested at 29. Not shown in FIG. 1, but constituting parts of the overall apparatus, are power supplies furnishing electric current needed to operate moving parts and sustain station processing and other functions (such as logical digital functions needed to control the apparatus and to interface it to external computer systems and the like requiring access to information stored on the discs), as well as cooling elements needed to maintain a dust free environment for the discs and a thermally stable environment for all of the equipment.

A single sided timing belt 30 (see FIG. 7), permanently secured to the outer periphery 1a of the tray, links the tray to indexing assembly 32. Assembly 32 is coupled to a not-shown bidirectional drive stepper motor. When access to a disc is required, the stepper motor is actuated to drive assembly 32, causing the tray to rotate until the required disc is aligned with a closest idle or other preferred station. Assembly 32 contains gears 33, 34 and 35, and a double sided timing belt 36. Teeth on gears 33–35 mesh with teeth on the inside of timing belt 36, and teeth on the outside of timing belt 36 mesh with teeth on timing belt 30. One of the gears 33 is coupled to the above-mentioned stepper motor and operated by the latter to transmit motion to the tray via belts 30 and 36 and the other gears.

The gears and timing belts are standard commercially available parts designed for 5 pitch incremental movement (5 teeth per inch). The predominant English standard has a center to center distance (tooth to tooth) of 0.197 inches. The Metric equivalent used in the preferred embodiment is 5 mm between centers of adjacent teeth. The circumference of the tray's outer periphery is 2000 mm and is chosen so that a single pitch increment of movement of the timing belt 30 attached to the tray displaces the tray at its outer periphery by exactly 5 mm. The spacing between centers of adjacent grooves 2 is made to be exactly 5 mm at the outer periphery. The step motor and its linkage to the tray periphery are chosen to produce exactly a 5 mm displacement at the tray outer periphery. A cost saving feature in this arrangement, is that standard off-the-shelf 5 pitch components (gears, timing belts, etc.), has a characteristic increment of a movement of 5 mm.

Another advantage is that to position a given groove in the tray to a station that is currently N grooves distant from the given groove (N an integer), requires specification to the step motor of a number M that is an integer multiple of N, and the step motor can then be operated "open loop" to perform the positioning (rather than requiring a complex computation to convert N to a number of displacements that is not directly related to the tray groove spacing, and possibly requiring closed loop control of the positioning itself), regardless of whether the station is inside the tray or outside of it.

The foregoing usage of standard stepper motor and 5 pitch elements in tray positioning hereafter is termed the 5 pitch feature. It has been determined that employing a pitch less than or greater than 5 pitch probably could be used in establishing tray groove spacings; but such usage would probably be more costly to manufacture than 5 pitch, less efficient in terms of the number of grooves that could be placed on a tray of given size for purposes presently contemplated, possibly more complex in the requirements for controlling tray positioning, and possibly even require closed loop control of the positioning. For example, a pitch e.g. greater than 5, would not yield enough space to fabricate greater than 5, would not yield enough space to fabricate of a CD.

As noted earlier, tray 1 contains 400 grooves that are by the tray peripheries. The number of grooves and their spacing is selected to coincide with increments of tray movement produced by an even multiple of step increments of operation of the step motor. Thus, increments of step motor movement required to align a groove containing a selected disc with a designated station are specifiable directly in terms of a multiple of the number of groove spaces between the selected groove and the designated station. This eliminates the complex computations usually required to convert desired increments of movement of an object positioned by a step motor to increments of step motor displacement that are not directly related to increments of object movement.

When access to a particular disc in tray 1 is required, and assuming the respective disc is not immediately aligned with an idle station (see Terminology above), the tray is rotated clockwise or counterclockwise to align the groove containing the selected disc with an idle station. The direction of tray rotation preferably is chosen to align the required disc with a closest idle station, so as to reduce the average "seek" time for effecting such groove aligning functions. When the groove containing the selected disc is suitably aligned, the transfer assembly of the respective station is actuated to perform a loading transfer in which the disc is first rotated— in a controllably driven manner—from the tray to a respective load/unload assembly—and then moved laterally by the load/unload assembly into a reading position at the processing station; e.g. into latched engagement with a rotating spindle at the reader. After processing of the disc at the reader, the disc is transferred laterally by the load/unload assembly to the transfer assembly, and then returned to the tray in a in a driven unloading rotational movement that is the reverse of the loading transfer movement.

Along a wall forming the inner periphery 1b of tray 1, four uniformly positioned polyurethane coated eccentric ball bearings 1c, riding along a dovetailing "rim" 1b' in the tray inner wall 1b (see FIG. 2), act as "tires" supporting rotation of the tray at that wall. Eight load bearing pads 1d, made of high molecular weight polyethylene present high slip (very low friction) surfaces to the underside of the tray as 2. Tray Groove Profiles As seen in FIGS. 2 and 2D, tray 1 is a composite structure consisting of a core 50 of lightweight metal (e.g. aluminum) overcoated with a layer 52 of elastomeric polymer containing the grooves 2 in which the discs are held. In these figures, the shape of a single groove 2 is seen in relation to the bottom edge 53 of a disc 54. As indicated by the 45 degree angle markings at 55, each groove is shaped to engage a disc over about a third of its circumference. As seen in FIG. 2B, each groove 2 has a V-shaped cross section tapering to a width less than that of a disc.

Discs are seated in the grooves with sufficient force to ensure that the discs are firmly held in upright positions and cannot shift out of their positions during rotations of the tray. In such seating, bottom edges of the discs penetrate into tapered portions of the grooves, distorting the elastomer around each groove to produce an "elastic pinching effect" holding the disc securely in place. The distorted elastomer tends to store energy enabling it to return the groove to its original shape when the disc is removed. This stored energy is manifested as a force producing the just-mentioned elastic pinching effect.

Near the tray peripheries 1a and 1b, each groove tapers away from the edge of the disc as shown at 56 and 57 (FIG. 2) to angular inclinations that are deliberately formed to be not more than 40 degrees relative to the horizontal. When transferred to a station, the disc must be driven up one of these inclines; the one at the outer periphery 1a if the station is outside the tray's outer periphery, or the one at the inner periphery 1b if the station is inside the tray's inner periphery.

It has been noted empirically that as the steepness of the groove incline increases, the initial speed of transfer movement must be geometrically decreased in order to avoid possible unstable movement of the disc as it clears the edge of the tray (for example, the disc could "jump", as it moves from the tray to the stage if driven up an incline at excessive speed, allowing the bottom edge of the disc to slip or slide uncontrollably, or allowing the top edges of the disc to lose contact with the transfer assembly belt (see below) with resulting loss of driving control over the disc rotation. It also has been noted that inclines around 40 degrees allow for optimization of the initial starting speed consistent with stable and safe disc handling. Accordingly, it is preferred that the inclines between the tray grooves and the stages over which the discs rotate during transfer (see below) be shaped to about a 40 degree angle relative to the horizontal.

The "elastic pinching" effect noted above serves not only to prevent the discs from slipping out of their grooves during rotations of the tray, but also to prevent the discs from slipping rotationally as they are driven up respective groove inclines during disc loading operations described below.

3. Transfer Assembly

Some aspects of "inside" processing station 11S and its associated disc handling (transfer and load/unload) assemblies 11T are viewable in FIGS. 2–5. Since all stations inside the inner tray periphery have identical constructions, these views are fully representative of the constructions of stations 11S, 13S, 15S and 17S and their respective disc handling assemblies 11T, 13T, 15T and 17T. Giving due consideration to the fact that station readers outside the tray need to have orientations relative to their transfer assemblies that are mirror images of orientations of station readers inside the tray relative to their transfer assemblies (since all discs in the tray have recording surfaces facing in the same direction, and therefore must be laterally shifted in mirror image directions as they are loaded into station readers on opposite sides of the tray peripheries), the constructions shown in FIGS. 2–5 may also be considered representative of the constructions of stations located outside the tray.

FIG. 2 shows the station and associated assemblies in an idle or "rest" position wherein neither the station nor its disc handling assemblies are handling a disc. FIG. 3 shows the station transfer assembly in a "pick out" position in which an aligning sub-assembly is acting to ensure that a disc selected to be transferred is suitably aligned for the transfer movement. FIG. 4 shows the transfer assembly in a loading position in which it is driving a disc from the tray to a position facing but lateral y displaced from the station reader. FIG. 5 shows the transfer assembly in a read (processing) position out of contact with a disc that is ready to be moved into the station reader.

Referring to FIG. 2, the disc transfer assembly comprises a topdrive assembly 68 and a grooved stage 69. During disc loading and unloading, topdrive assembly 68 contacts and controllably drives a disc along its top edges, while bottom edges of the same disc are held in and guided by a groove 69a in stage 69. The alignment between the topdrive assembly and the groove in the stage ensures that the disc is driven in a perfectly vertical orientation and the structures of these elements ensures that the disc cannot stray from the required path of movement (i.e. that it cannot slip, slide, wobble, etc.) during its controlled drive. Groove 69a is formed in an elastomeric material and has a V-shaped bottom tapered cross-section allowing for centered positioning of discs varying in thickness from approximately 0.042 to 0.056 inches (the range of presently standardized compact discs). The elastomer in groove 69a is chosen to have a greater hardness than the elastomer in tray grooves 2; since the purpose of groove 69a is to keep the bottom edges of the disc from deviating from the desired plane of transfer rotation, without impeding the rotation, whereas grooves 2 in the tray are required to keep the discs properly seated during rotations of the tray (which exert inertial forces on the discs perpendicular to their plenes of transfer rotation).

Topdrive assembly 68 is at the heart of the subject changer's fast operation, allowing for very short loading and unloading times less than 250 milliseconds. Assembly 68 includes a stamped overarm assembly 70, supporting a pair of pulleys 71 and 72, and a polyurethane belt 73 riding on the pulleys. Assembly 68 also includes a stamped cam 74, a forward solenoid 75, a rear solenoid 76, and two guide/support pillars—fulcrum pillar 77 and distal and column 78. A bidirectional step motor 79 (seen in FIG. 6), whose axis of rotation is at 80, is housed on the fulcrum pillar. Step motor 79 drives belt 73 in opposite directions (through pulley 72) during loading and unloading of a disc. The lateral center of belt 73 along its length is aligned with the transfer plane over which the (centers of the) discs are to be driven. The belt is shaped in cross-section in the form of an inverted V (FIG. 2C), for holding top edges of discs of different thicknesses, in the above-mentioned standard range, in appropriate alignment to the required plane of rotation throughout the transfer movement, as well as for ensuring correct alignment of discs that have their centers misaligned relative to that plane when initially contacted by the belt.

Like groove 69a in stage 69, belt 73 has greater hardness than the elastomeric coating of the tray in which tray grooves 2 are formed, and is made of a material forming a slip-free contact with the top edges of the disc throughout the transfer movement.

Cam 74 is pivotally mounted on fulcrum pillar 77 with its center of rotation around, but not driven by, step motor 79 (the step motor that drives belt 73). Cam 74 is attached to overarm assembly by (front) coil spring 81 arranged to cause the overarm to pivot in the same direction as cam 74 when the cam pivots.

In the "rest state" shown in FIG. 2, cam 74 is spring-loaded against stop 200 by rear spring 92, and overarm 70 rests on the lateral finger 82 of the cam, preventing the overarm and belt 73 from contacting discs carried on tray 1 (e.g. while the tray is in motion). The bottom front of cam 74 is attached to solenoid 75. A lead counterweight 95 is attached to the rear of overarm 70 and rear solenoid 76. With neither of solenoids 75 and 76 energized, the weight of the overarm's long extension is balanced by that of counterweight 95.

Upon energization of front solenoid 75, the front of cam 74 pivots down, lowering overarm 70 and belt 73 towards the tray (see FIG. 3). In this movement, the inverted V underside of belt 73 (FIG. 2C) is brought into contact with top edges of a disc 54 in the tray, in preparation for loading that disc. This pivotal movement of the overarm places the transfer assembly in the "pick out" position shown in FIG. 3.

Referring to FIGS. 2 and 3, as arm 70 lowers from its rest position to the pick out position, pick member 83 on the end of the arm engages plastic comb 84 rotating the comb counter-clockwise. This causes teeth 85 on the comb (see FIG. 2A), which are tapered to reliably capture opposite surfaces of the disc to be transferred, to sweep up and over opposite surfaces of the selected disc, from an initial position outside of the periphery of that disc, and thereby straighten the disc to vertical alignment if the disc happens to be tilted when the comb engages its surfaces. In most instances the discs in the tray will have suitable vertical alignment prior to this operation. However, the comb action ensures such alignment in exceptional instances where discs that are selected for loading have not properly seated in respective holding grooves 2 in the tray. The comb action completes just before belt 73 reaches a position at which it is supposed to contact the top edge of the disc. Therefore, the top edge of the disc will reliably align with and be contacted by the inverted V grooved surface of belt 73 at the conclusion of the pick out movement.

The comb teeth are formed of a suitable low friction material minimizing the possibility of damage to the recording surface of the disc, and the shape of the teeth and their path of movement during the alignment ensures that there will be minimal contact with the disc surfaces inside of a non-recording margin at the periphery of the disc.

The construction of the comb teeth allows for them to be moved to the pick-out position without waiting for any vibrations of the discs in the tray (e.g. due to inertia of the tray movement) to settle out. In fact, the comb teeth can be used at such times to quickly dampen any vibrations of the selected disc and the discs adjacent to it.

When belt 73 contacts the top of the disc, the unsupported span of the belt between pulley 71 and raceway 86 flexes longitudinally, allowing the belt to wrap itself around a circumferential portion of the disc as seen in FIG. 3 thereby securing firm contact between the belt and the disc, allowing the disc to be controllably and quickly accelerated from its rest position in the tray.

As the underside of belt 73 contacts the top edge of a selected disc, step motor 79 is actuated to drive the belt. The step motor is driven by a programmable controller (made by Cybernetics Corporation). Said step motor is accelerated rapidly to drive the selected disc quickly, in a clockwise direction (as viewed in FIG. 2), to move it quickly out of its holding groove in the tray onto groove 69a on stage 69, and then even more quickly over the stage to a load position at which the load/unload assembly will take control of the disc and latch it into engagement with a rotatable spindle in the station reader (see description of Load/unload Assembly below). As the disc approaches this load position the step motor driving the belt is rapidly decelerated to bring the disc to a safely controlled stop at the load position.

The energization of solenoid 75 (FIG. 2) actually causes the front of cam 74 to lower more than the overarm, stretching spring 81. This creates a downward force that is transferred to the area of contact between the belt and the top edge of the disc, creating more friction between the belt and disc edge and thereby decreasing the possibility of slippage during the rapid acceleration of the disc out of the tray.

As the disc is driven out of the tray, the arm rises to the position shown in FIG. 4, retracting pick member 83 from contact with comb 84. This allows the comb to fall back clockwise to its rest position (FIG. 2), where it is outside of the path of movement of the discs in the tray. Thus, as soon as a disc is moved out of the tray onto a stage such as 69, (and potentially while the transfer rotation and load/unload movements of the same disc are still being handled), the tray can be moved; e.g. to service another loading or unloading operation or to reposition the tray so that the disc just transferred can be unloaded to a groove in the tray different from the one from which it was removed (see discussion of sorting applications below).

As belt 73 is driven, a portion of its upper surface is held in and guided by a high molecular weight polyethylene raceway 86 attached to overarm 70. This raceway presents a low friction surface guiding the belt and preventing it from moving laterally or vertically. The raceway overlies a portion of the stage, and the belt is unconstrained in the area above the tray where it initially contacts the disc. Thus, the belt is free in that area to wrap itself into conformance with the disc periphery as explained previously, in order to secure sufficient contact with the disc ensuring that the latter is properly controlled during its initial acceleration out of the tray groove.

In FIG. 4, topdrive arm 70 and belt 73 are shown in a load position in which belt 73 and a disc 54' transferred by the belt are both at a standstill but still in contact. At this position (see FIG. 6), stage 69 contains a stepped depression opening into a shelf 69b that is aligned with the groove 69a previously discussed. Shelf 69b opens into another depression 90 which is below the station reader 99 and its spindle 98, the latter to be described later (see description of load/unload assembly). The disc, which is now held upon ledge 69b by the belt and by parts of the load/unload assembly discussed below with reference to FIGS. 8–12, is required to be moved laterally over the depression 90 by the load/unload assembly in order to engage the above-mentioned spindle in the opening at the center of the disc.

An infrared sensor 93 and a plastic stop 94 shown add further control and safety to disc handling. Stop 94 is positioned to prevent movement of the disc beyond the loading position (the position wherein the center opening of the disc is aligned with a spindle in the station reader and the disc itself is suitably aligned with the load/unload assembly to be reliably transferrable to the reader spindle. Sensor 93 operates to detect the leading edge of the disc as it rotates towards the loading position and to detect the trailing edge of the disc as the disc reaches the loading position. The sensor provides signals useful to permit the apparatus to verify that a disc will be placed at the loading position.

In FIG. 5, topdrive arm 70 has been raised slightly by operation of solenoid 76 to raise belt 73 out of contact with the top edge of disc 54', and disc 54' is shown held in a position in which it is under exclusive control of the load/unload assembly.

4. Dimensions

Some relevant dimensions of the foregoing apparatus are:
a) Tray circumference: 2000 mm (pitch line of 400 tooth belt)
b) Tray ID circumference: 1760 mm
c) Disc mean diameter: 120 mm
d) Disc mean thickness: 0.050 inches 5. Disc Handling Considerations In respect to the foregoing, a number of disc handling factors should be noted.

First of all, a factor to consider is the hardness of the elastomer in which the tray grooves are formed. The material should be soft enough to exert the "elastic pinching" effect described previously, but not so soft as to allow for the discs to shift or vibrate excessively during movements of the tray. A suitable hardness for the tray elastomer is a shore A value of 75–80.

The purpose of the elastomeric groove in the stage is only to guide the discs, not to "elastically pinch" them, and present a non-slip surface to the bottom edges of the discs during their transfer rotations. Accordingly, the elastomer containing the groove in the stage can be harder than that containing the grooves in the tray (a suitable hardness for the stage elastomer would be a shore A value in the range 80–85).

Finally, the purpose of the inverted V groove in the belt is to both guide and drive the disc top edges with minimal slip. A suitable form for the belt groove is shown in FIG. 2C, and a suitable hardness for the surface of the belt at that groove would be a shore A value in the range 80 to 85.

6. Load/Unload Assembly

The load/unload assembly 100, described with reference to FIGS. 8–12, serves two purposes noted briefly above: (a) it holds the disc on shelf 69b while the topdrive belt is being disengaged from the disc during loading and re-engaged with the disc during unloading; and (b) it operates to transfer the disc laterally (in a direction transverse to its path of movement by the topdrive belt) over the depression 90 and latch the disc to a bull nosed rotatable magnetic spindle 98 that is part of a compact disc reader (or reader/recorder) 99, the latter shown in block form in FIGS. 8–12. In the lateral transfer to spindle 98, a center opening in the disc 54a is engaged to a matching boss on the spindle 98. In the lateral transfers between the loading position and the spindle, the disc is moved from alignment with a vertical plane extending through shelf 69b to alignment with a vertical plane extending through the tip of spindle 98, during loading, and from the spindle back to alignment with the vertical plane through the shelf during unloading.

In the embodiment shown, the discs are conventional compact discs and/or CD-ROMs (as known today), having predetermined widths and diameters within predetermined tolerances. Each such disc has a recorded/recordable side and a non-recordable opposite side. In the lateral movements of the discs between the shelf vertical plane and reader spindle, the recorded/recordable surface of the disc faces the spindle and the non-recordable surface faces towards the vertical rise between shelf 69b and stage 69 (i.e. towards the load position on the stage).

During such lateral movements, the non-recordable side of the disc is held against latch 101 retained movably within a keeper housing 102 (see FIG. 10A). The latch is movable in three dimensions to adjust to planes in which the disc is oriented when it moves under control of the latch/unlatch assembly, and when it is mounted on the reader spindle.

As indicated in FIG. 10A, latch 101 contains a flat piece of magnetizable sheet metal 101a imbedded in a plastic well 101b containing an opening 101c in its face 104 that conforms to the bullnose shape of the tip of the reader spindle 98. The spindle is magnetic (made of rare earth), and therefore attracts and holds latch 101 when the latter is close to the spindle. A not-shown leaf spring in keeper 102 biases latch 101 into a ready position (the position when assembly 100 is prepared to receive an oncoming disc from the topdrive assembly) slightly tilted across the plane of movement of an oncoming disc so as to permit the latch to easily align with the disc as the leading edge of the disc passes the latch.

Assembly 100 also includes upper and lower fingers (FIG. 6), 110 and 111 respectively. During loading and unloading of a disc, these fingers contact the data side of the disc, respectively along upper and lower non-data marginal portions of that side, holding the disc against the face 104 of latch 101, with the center opening 54 of the disc facing well opening 101c in latch 101. The forces exerted by the fingers against the disc preferably are sufficient to hold the disc securely against the latch but insufficient to cause bending or flexing of the disc. This is further assured by the presence of the back finger guide 140 which acts as a limit to lateral overtravel of the top of the disc.

Fingers 110 and 111 have radiused tips, for smoothly engaging discs during loading and disengaging from discs during unloading. The fingers are connected to a blue steel spring hinge 112 (FIGS. 8–12) that is attached to vertical latch base 120 (FIGS. 8–12). The fingers and latch base are pivotable by two sets of cams 96a and 96b, both operated by rotary solenoid 96. One set of upper and lower cams 96a control fingers 110 and 111 and one set of upper and lower cams 96b control latch arm 121.

FIGS. 8–12 show positions of load/unload assembly 100 during a loading operation, as a disc is moved progressively from the tray to the load position over shelf 69b and then laterally over to the reader spindle. Viewed in the reverse order, these figures show the positions of assembly 100 as a disc is moved progressively off the spindle to shelf 69b and returned to the tray.

Figure 9:
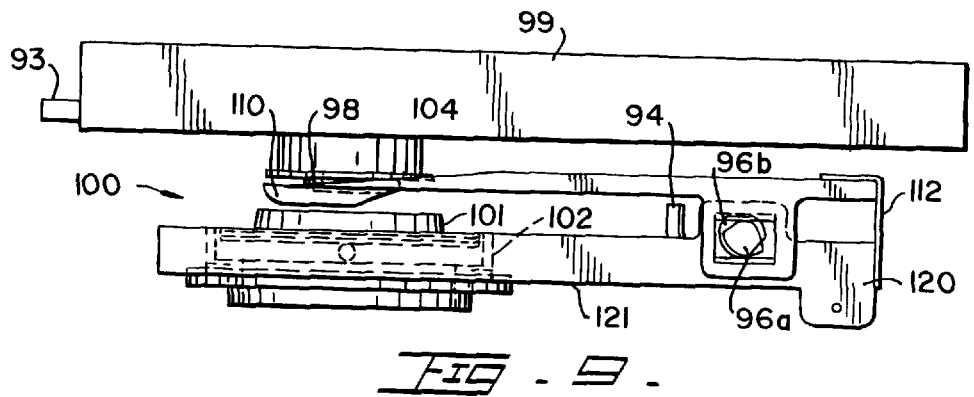
FIG. 9 is a top view of the same load/unload assembly, showing it in a position in a "cocked" position in which its fingers are positioned to intercept a disc currently being moved towards them by the respective transfer assembly.
Figure 10:
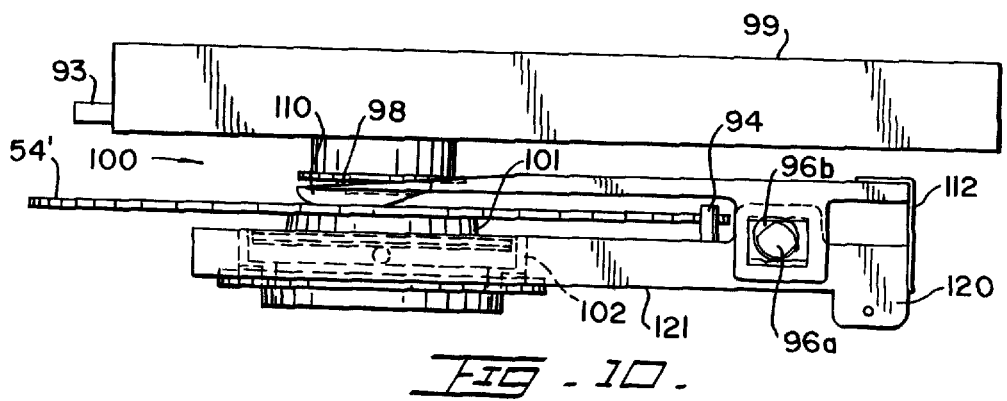
FIG. 10 is a top view of the same load/unload assembly showing its operational position just as it receives a disc that is still in contact with the transfer assembly.
Figure 12:
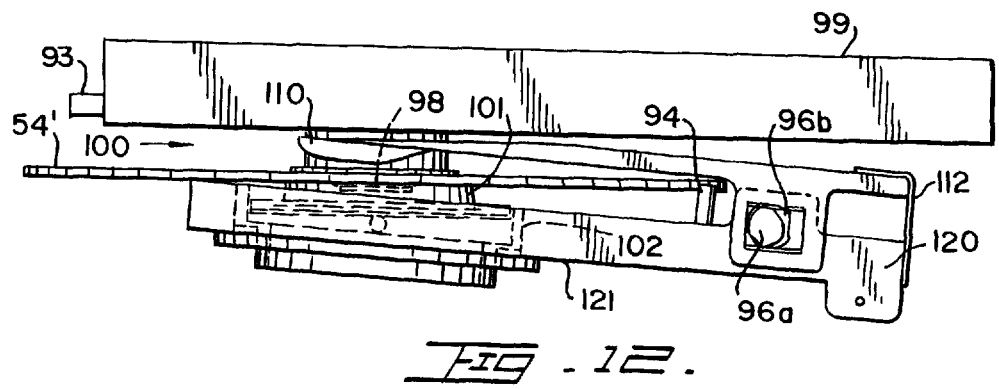
FIG. 12 is top view of the load/unload assembly showing it operated to a processing position wherein the disc and spindle are freely rotatable and finger elements in the respective load/unload assembly, which in FIGS. 10 and 11 are in contact with and temporarily holding the disc along a marginal portion of its recordable surface, are pivoted out of contact with the disc to permit the disc to rotate freely.

FIG. 8 shows assembly 100 at rest (disc still in tray). FIG. 9 shows the assembly in a "ready" position, prepared to receive a disc 54' that has just moved out of the tray. FIG. 10 shows the assembly in a "load" position with disc 54' engaged between the fingers and latch. FIG. 11 shows the assembly in a "moved" position wherein the disc is mounted on spindle 98, but still in contact with the assembly fingers. FIG. 12 shows the assembly in read/write position, with its fingers retracted (removed from contact with the disc) and the spindle, disc and latch thereby free to spin as a unit.

Load/unload assembly 100 is; rotated by rotary solenoid 96 which drives finger cam 96a and latch cam 96b. As shown in FIG. 8, the rotary solenoid is in a power-off condition such that latch arm 121 and fingers 110 and 111 (in this rest/power-off position) are urged clockwise by the internal rotary return spring of rotary solenoid 96. FIG. 12 shows the load/unload assembly 100 in a power-off position, with a disc 54' in the read position on spindle 98 with fingers not contacting said disc in order that it may spin freely. FIGS. 9 and 10 show rotary solenoid 96 in a powered position constructed and arranged such that cams 96a and 96b are rotated in a counter-clockwise direction (compared to FIG. 8), rotating both fingers 110 and 111 and latch arm 121 in a counter clockwise direction, to be in an open position to receive an oncoming disc (FIG. 9). FIG. 11 is a snapshot of the load/unload assembly taken as latch arm 121 has completed its movement to the power-off position and fingers 110 and 111 still have additional rotational movement (cam 96a) to move to the power-off position.

In the assembly ready position (FIG. 9), face 104 of latch 101 is aligned to the path of movement of the oncoming disc, by the not-shown leaf spring within keeper assembly 102. In this position, the leading edge of the oncoming disc (not visible in FIG. 9 but approaching assembly 100 from the left in that figure) is heading towards contact point 105 on latch 101 (see FIGS. 9 and 10A), and the latch face 104 is positioned at an angle across the path of movement of the oncoming disc so as to permit the latch to align easily with the disc. Shortly afterwards, the leading edge of the oncoming disc is driven between the fingers 110, 111 and contact point 105 of latch 101. As the disc continues to be rotationally driven towards its load position (centered over shelf 69b in stage 69), it courses by the face 104 of the latch with slight interference, tilting the face from its spring-biased orientation and forcing the latch deeper into keeper 102.

In the load position of FIG. 10, the disc is held between the belt and shelf 69b of stage 69, with its center aligned with the reader spindle. The belt has stopped moving and thus the disc has stopped rotating. The disc is now in contact with both the belt and the fingers and latch of assembly 100. As noted earlier, the pressure of the fingers against the disc preferably is sufficient to hold the disc but not bend or flex it. As the disc reaches this position, the topdrive arm is raised disengaging the belt from contact with the disc by solenoid 76.

With the belt disengaged, assembly 100 is moved laterally towards the reader 99, by operation of rotary solenoid 96 and cams 96a and 96b, moving the disc into engagement with the spindle. This lateral movement, over a rather small distance (less than 1/16 inch) carries the disc off the shelf 69b across the depression 90 (FIG. 6). The disc is securely held between the fingers and latch, and any (remote) possibility of the disc slipping vertically (downward) towards the depression 90 is offset by the engagement of the bull nosed radius of the spindle 98 to the center opening of the disc 54a, which would cause the disc to return to centered alignment with the spindle even if it had slipped slightly downward during the movement.

As seen in FIG. 11, assembly 100 has carried a disc 54' over to the spindle, and fingers 110 and ill are still in contact with the disc. As seen in FIG. 12, the fingers have been pivoted out of contact with the disc by cam 96a. The disc, spindle and latch are then free to rotate as a unit, and the not-shown reader motor that drives the spindle is "spun up".

After the disc has been read or otherwise processed, the disc is returned to the tray in an unloading operation that is the reverse of the loading operation just described. First, the load/unload assembly is moved from the position of FIG. 12 back to that of FIG. 11, with the fingers contacting the disc and exerting sufficient force to break the magnetic attraction between the spindle and latch so as to allow the disc to return to the load position on shelf 69b. As the bottom edge of the disc moves onto the shelf 69b, and its non-data side banks up against the vertical rise 69c between the shelf and the top of stage 69, the top edge of the non-data side of the disc banks against back finger guide 140 (FIG. 6) that is positioned opposite the upper finger 110 which assists in aligning the disc vertically for the V groove of the top drive belt which is brought down into contact with the disc and driven in the reverse direction to drive the disc back to the tray. During this lateral movement, in the event the transferred disc should slip vertically downward, the bottom edge of the disc will engage the slope of depression 90 and the disc will be urged up the slope of depression 90 onto shelf 69b by fingers 100 and 111.

At this position, the topdrive belt is brought down into contact with the disc and driven in the reverse direction to rotate the disc back to the tray, where as shown in FIG. 2, over arm 68 will release from contact with said selected disc when said disc is safely returned to a groove 2.

7. Disc Repositioning

Normally, after a disc has been loaded and processed, it is returned to the tray at the groove position from which it was loaded. The tray may be moved while the disc is being read, to allow for aligning and loading of other discs at other stations, and if it has moved it will be returned to the position required to seat the unloaded disc in its original groove. However, in some instances, it may be desirable to reposition the tray and unload the disc to a groove in the tray different from the one it was in before it was loaded.

For instance, with the eight stations and tray shown and described above, it is possible to reposition discs relative to each other; for instance, to place frequently loaded discs closer to the stations than less frequently loaded discs, and thereby reduce the average seek time for positioning discs to be loaded in line with stations.

In such "sorting" operations, assuming all grooves in the tray are filled with discs, one could manipulate the system to load 8 discs from a group of 8 grooves/slots into the 8 stations, and then selectively unload the discs to the same group of slots but at different slot positions so that the positions of the discs relative to a given station are varied as a function of the history of usage of respective discs, placing discs most frequently loaded nearest to stations and discs least frequently loaded furthest from stations.

8. Operational Flow Sequence

In a typical operation of the subject apparatus, wherein information contained on discs is to be read at the stations, the apparatus receives requests for information and translates them into locations of grooves in the tray holding discs containing the requested information. For each request, the tray is repositioned to align the groove holding the disc that contains the requested information with a nearest idle one of the eight stations. Obviously, this repositioning step could be skipped if the desired disc is aligned to a station when the request is being handled. Next, the transfer mechanism of the respective station is actuated, controllably driving the disc out of the groove and into the respective station, then the load/unload assembly at the station secures the disc to the station spindle, the requested information is read out, and the disc is unloaded back to the tray by reversed operations of the load/unload assembly and transfer mechanism.

The source of the foregoing requests is immaterial to the invention. But those skilled in the art should recognize that it could be a computer server linked to multiple users through a network, or even a personal computer owned by a single user of that computer and the subject apparatus.

The repositioning of the tray to align the requisite groove with the nearest idle station could be specified as a product of numbers n and k; where n is a variable defining the number of groove spaces between the required groove and the nearest station and k is a constant related to the number of increments of tray movement required to displace the tray by a single groove spacing. That number would be applied to the controls of the step motor that drives the tray, and the tray then could be moved through the requisite distance in an appropriate acceleration/deceleration pattern.

As noted earlier, as soon as a selected disc is moved out of its groove by a transfer mechanism, the aligning comb 84 (FIG. 2) drops out of the way permitting further movement of the tray. Thus, while a selected disc is being moved into the station, secured for reading and read, the tray may be simultaneously moved to prepare discs associated with other requests for handling.

As also noted earlier, a disc unloaded from a station may be returned either to the groove from which it was loaded or a different groove, depending upon requirements of the system in which the apparatus is used.

Alternate Embodiments

Alternate embodiments of the invention presently contemplated include: a) apparatus in which the tray is a part (e.g. a 90 degree section) of the tray heretofore described, holding fewer discs, and operating relative to fewer stations, where the station and its transfer and load/unload assemblies rotates relative to the tray to align with a disc to be transferred; and b) a linear configuration wherein the tray has rectangular form and is moved linearly relative to one or more stations positioned on opposite sides of the path of tray movement.

Variations of these alternate embodiments are also considered within the scope of the invention and its claims.

For example, although the preferred embodiment has a circular tray that is rotated relative to the stations, it is also considered feasible to arrange for the stations and their disc handling assemblies to be rotated relative to a stationary tray to accomplish the same functions.

Another alternative includes a tray design, with stations as previously described and a circular tray as described, however, this design saves space in the over all dimensional width of the circular tray, where a smaller overall diameter of e.g. 15 inches allows storage of the entire unit in standard 21 inch equipment racks. The smaller diameter is realized by placing a smaller number of grooves in the tray, e.g. 240 grooves around the circular tray that are aligned at oblique angles to the radius edge of the circular tray as shown in FIG. 13. In this embodiment, the four stations 20s, 21s, 22s, and 23s plus four transfer assemblies 20t, 21t, 22t, and 23t are arranged toward the outside periphery of the tray such that the a disc is driven to a stage and load/unload assembly and reader, outside of the tray's perimeter. FIG. 13, where possible is marked using prime numbers to indicate the similarity of operation to the corresponding numbered figures.

As shown in FIG. 13, a tray 1' has a circular shaped inner and outer periphery, said inner periphery 5 coinciding with at least a portion of the circumference of a first circle and said outer periphery 1a' coinciding with at least a portion of the circumference of a second circle. The tray has linear grooves 2' (shown as lines in FIG. 13) formed in a surface thereof for holding multiple disc in close proximity. Each groove forms a predetermined oblique angle with a radius of one of said first and second circles at a point on the respective one of said first and second circles at which the respective groove and radius intersect disc processing station e.g. 20s proximate to one of said inner and outer peripheries of said tray includes means for moving a disc between any selected one of said grooves in said tray and said disc processing station.

The disc processing station includes a predetermined disc loading position proximate to a predetermined fixed point on one of said first and second circles and includes means for moving a disc between any selected one of said grooves. The disc processing station includes means for effecting relative movement between said tray and said loading position of said station to position an end of a said any selected groove in said tray adjacent to said predetermined fixed point.

The predetermined disc loading position is aligned with said any selected groove in said tray at said predetermined fixed point when said any selected groove is positioned with an end thereof adjacent to said predetermined fixed point by operation of said means for effecting relative movement. There is a means for driving said disc between a groove holding said disc and said predetermined loading position, using the top drive assembly previously described when said end of the groove holding said disc has been positioned adjacent said predetermined loading position by said means for effecting relative movement. Said tray can preferably operate with the identical transfer assembly and load/unload assembly, stations and processing stations as previously described herein.

Wherefore, I claim:

1. Automatic disc changer apparatus comprising:

a base structure;

a tray supported on said base structure for holding multiple record discs in close proximity to each other;

a disc processing station supported on said base structure; said processing station containing a predetermined disc loading position;

means to transfer a selected disc from said tray to said predetermined disc loading position of said processing station in a controllably driven rotational movement; said transfer means including a flexible belt having a portion of its length overlying both said tray and said predetermined disc loading position, means to bring said flexible belt into contact with a top edge portion of said selected disc, and means for moving said flexible belt lengthwise to controllably drive said selected disc between said tray and said disc loading position in a rotational movement of said disc; and means for effecting relative movement between said tray and said predetermined disc loading position to align a said selected disc in said tray with said predetermined disc loading position; said apparatus further including:

a latch element attractable magnetically to said spindle, a pair of movable guide fingers, means for initially positioning said guide fingers and said latch element to contact and bear against opposite surfaces of said selected disc as said disc enters said predetermined disc loading position, while being driven by said flexible belt, allowing said flexible belt to be immediately disengaged from contact with said top portion of said selected disc as said disc is moved into said predetermined loading position; and means to move said fingers and latch element, with said selected disc held between them, to bring the latch element and disc into magnetically latched contact with said spindle, and simultaneously disengage said guide fingers from contact with said disc, in order to allow said spindle, disc and latch element to be freely rotated as a unit.

2. Automatic disc changer apparatus comprising:

a base structure;

a tray supported on said base structure for holding multiple discs in close proximity;

a reading station supported on said base structure; said reading station having a predetermined disc loading position;

means for effecting relative movement between said tray and said predetermined disc loading position to align any selected disc one of said discs on said tray with a plane extending through said tray and said predetermined disc loading position;

means for controllably driving said selected disc, in alignment to said extending plane, to move said selected disc from said tray to said predetermined disc loading position; said means for driving maintaining precise control over the orientation and speed of movement of said selected disc throughout said movement from said tray to said loading position; said driving means further comprising:

an arm extending over said tray and said predetermined disc loading position;

a flexible belt supported on said arm; said belt extending lengthwise over said tray and said loading position, and having its lengthwise center lying in said extending plane; said belt being supported for linear movement of its said lengthwise center in said extending plane;

means for moving said arm and said belt towards and away from said tray for placing said belt in and out of lengthwise contact with a top edge portion of a said selected disc in said tray;

means for linearly moving said flexible belt, while said belt is in lengthwise contact with said top edge portion of a said selected disc, to rotationally drive said selected disc out of said tray and over to said predetermined loading positions;

means aligned with said extending plane, within said tray and between said tray and said loading position, for securely holding and guiding a bottom edge portion of said selected disc as that disc is being rotationally driven by said belt from said tray to said loading position, thus constraining said selected disc to rotate in alignment with said extending plane throughout the rotational movement of that disc from said tray to said loading position; and disc aligning means, actuated in coordination with said movement of said arm and belt towards said tray, for ensuring that said top edge portion of said selected disc is aligned to said lengthwise center of said belt prior to said arm and belt reaching a point in their movement at which the belt could contact said selected disc; said disc aligning means comprising:

a pick element suspended from said arm; and a comb element aligned with said predetermined loading position, said comb element having a pair of spaced teeth positioned outside of the periphery of said selected disc prior to said movement of said arm and flexible belt towards said tray;

said pick element engaging said comb element, during said movement of said arm and flexible belt towards said tray, to cause said teeth of said comb element to pass across opposite surfaces of said selected disc and align said selected disc to said extending plane if said selected disc was previously misaligned to that plane, thereby causing said top edge portion of said selected disc to be placed in alignment with said lengthwise center of said belt if said top edge portion was previously misaligned to said lengthwise center.

* * * * *